United States Patent [19]
Sweeney

[11] Patent Number: 5,188,507
[45] Date of Patent: Feb. 23, 1993

[54] LOW-PRESSURE TURBINE SHROUD

[75] Inventor: Derek J. Sweeney, Dublin, Ireland

[73] Assignee: General Electric Company, Cincinnati, Ohio

[21] Appl. No.: 799,528

[22] Filed: Nov. 27, 1991

[51] Int. Cl.$^5$ .............................................. F01D 11/08
[52] U.S. Cl. .................. 415/173.1; 415/170.1; 415/173.3; 415/173.4; 415/174.2
[58] Field of Search ............... 415/170.1, 173.1, 173.2, 415/173.3, 173.4, 173.5, 174.2

[56] References Cited

U.S. PATENT DOCUMENTS

| | | | |
|---|---|---|---|
| 3,056,583 | 10/1962 | Varadi et al. | 253/78 |
| 3,126,149 | 3/1964 | Bowers et al. | 415/173.4 |
| 3,393,894 | 7/1968 | Redsell | 253/78 |
| 3,542,483 | 11/1970 | Gagliardi | 415/136 |
| 3,947,145 | 3/1976 | Michel et al. | 415/217 |
| 4,023,919 | 5/1977 | Patterson | 415/173.4 |
| 4,053,254 | 10/1977 | Chaplin et al. | 415/116 |
| 4,087,199 | 5/1978 | Hemsworth et al. | 415/173.3 |
| 4,242,042 | 12/1980 | Schwarz | 415/116 |
| 4,303,371 | 12/1981 | Eckert | 415/116 |
| 4,524,980 | 6/1985 | Lillibridge et al. | 277/199 |
| 4,537,024 | 8/1985 | Grosjean | 60/161 |
| 4,551,064 | 11/1985 | Pask | 415/116 |
| 4,573,866 | 3/1986 | Sandy, Jr. et al. | 415/116 |
| 4,596,116 | 6/1987 | Mandet et al. | 415/173.4 |
| 4,676,715 | 6/1987 | Imbault et al. | 415/173.4 |
| 4,749,333 | 6/1988 | Bonner et al. | 415/189 |
| 4,925,365 | 5/1990 | Crozet et al. | 415/139 |
| 5,044,881 | 9/1991 | Dodd et al. | 415/173.4 |
| 5,131,813 | 7/1992 | Przytulski et al. | 416/217 |

Primary Examiner—Edward K. Look
Assistant Examiner—Mark Sgantzos
Attorney, Agent, or Firm—Jerome C. Squillaro; John R. Rafter

[57] ABSTRACT

A turbine shroud is formed by a ring of butted shroud segments. Each turbine shroud segment has a radially inwardly projecting annular flange which is seated on a radially outwardly facing surface of an annular tip of the outer shroud of the downstream nozzle stage. This flange is free to slide axially relative to the annular tip during thermal expansion of the nozzle outer shroud in the axial direction. Each turbine shroud segment has a spring seated thereon which urges the radially inwardly projecting flange toward the annular tip of the nozzle outer shroud. Honeycomb material attached to the turbine shroud segment discourages the flow of hot gases through the gap between the flange and annular tip of the outer shroud of the downstream nozzle stage attributable to seam chording, thereby reducing the leakage of hot gas into the spaces between the shrouds and the outer casing.

19 Claims, 3 Drawing Sheets

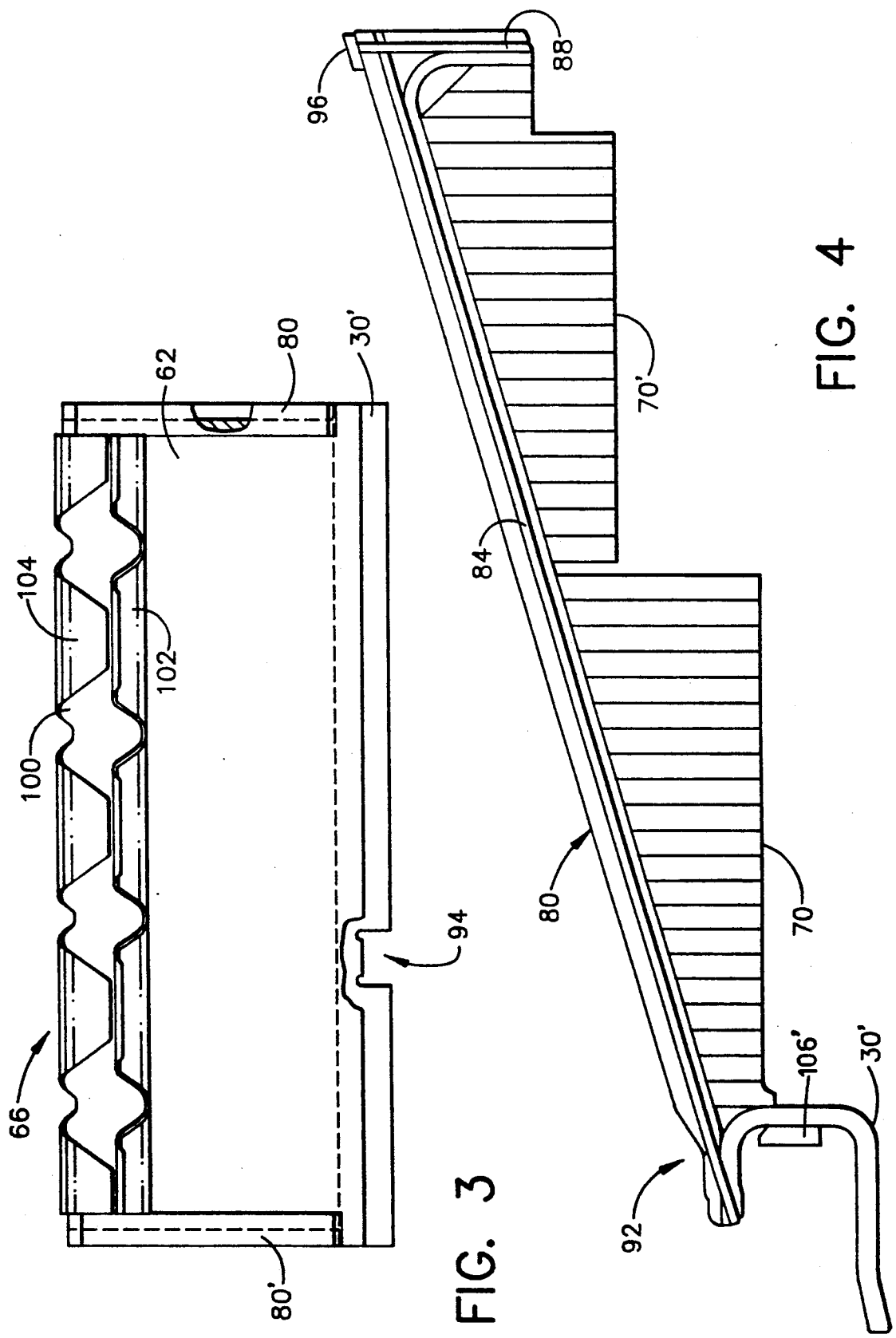

5,188,507

LOW-PRESSURE TURBINE SHROUD

FIELD OF THE INVENTION

This invention relates generally to the shroud surrounding a rotor stage of a low-pressure turbine in an axial flow gas turbine engine. Specifically, the invention relates to an improved mechanism for reducing hot gas leakage into the spaces between the shrouds and the outer casing.

BACKGROUND OF THE INVENTION

In a gas turbine aircraft engine air enters at the engine inlet and flows from there into the compressor. Compressed air flows to the combustor where it is mixed with injected fuel and the fuel-air mixture is ignited. The hot combustion gases flow through the turbine. The turbine extracts energy from the hot gases, converting it to power to drive the compressor and any mechanical load connected to the drive. These hot gases produce temperature differentials that can cause plastic deformation of the turbine casing if the latter is not properly shielded.

The turbine consists of a plurality of stages. Each stage is comprised of a rotating multi-bladed rotor and a nonrotating multi-vane stator. The blades of the rotor are circumferentially distributed on a disk for rotation therewith about the disk axis. The stator is formed by a plurality of nozzle segments which are butted end to end to form a complete ring. Each nozzle segment comprises a plurality of generally radially disposed vanes supported between inner and outer platforms. Each vane and blade comprise an airfoil section.

The abutting outer platforms of the nozzle segments and the abutting outer platforms of the rotor blades collectively define a radially inwardly facing wall of an annular gas flow passageway through the turbine, while the abutting inner platforms of the nozzle segments and the abutting inner platforms of the rotor blades collectively define a radially outwardly facing wall of the annular gas flow passageway. The airfoils of the rotor blades and nozzle guide vanes extend radially into the passageway to interact aerodynamically with the gas flow therethrough.

During operation of the gas turbine engine, it is desirable to minimize thermally induced plastic deformation of the outer casing. This can be accomplished by isolating the outer casing from the heat produced by the hot gases flowing through the turbine.

One source of hot gas leakage into the space between the outer casing and the annular passageway is the interface between the turbine shroud and the hardware which supports the aft edge of the shroud. For example, in U.S. Pat. No. 3,393,894 to Redsell, the turbine shrouds are trapped between the casing and the nozzle. Alternatively, as shown in U.S. Pat. No. 3,542,483 to Gagliardi, the outer shrouds and blade rings can all be hung from the casing with the outer shrouds and blade rings stacked axially in abutting sequence. In accordance with such prior art arrangements, a clearance fit in the axial direction is required to accommodate mechanical stack-up, differential expansion and assembly of the components. Such an axial clearance is susceptible to hot gases leaking therethrough.

One technique for blocking gas flow through an axial clearance, disclosed in U.S. Pat. No. 4,573,866 to Sandy, Jr. et al., is to insert a spring bellows seal in an annular groove between the casing and the nozzle. The seal forms a barrier to gas which has flowed through an axial clearance between the nozzle and the tip shroud support ring.

In the case where a curved circumferential surface of a turbine shroud bears on a curved circumferential surface of an outer platform of a nozzle, as taught in U.S. Pat. No. 3,056,583 to Varadi et al. and U.S. Pat. No. 4,537,024 to Grosjean, a different problem arises. Due to differential expansion during operation, the nozzle outer platform becomes hotter and expands more than the turbine shroud, causing the radius of curvature of the nozzle outer platform to become greater than the radius of curvature of the turbine shroud. The result is a gap between the overlapping turbine shroud and nozzle outer platform, through which hot gases leak from the annular gas flow passageway. These hot gases can produce an undesirable increase in the temperature of the outer casing.

SUMMARY OF THE INVENTION

An object of the present invention is to improve upon the prior art mechanisms for minimizing the leakage of hot gases between the turbine shroud and the nozzle, thereby minimizing the temperature of the outer casing. In particular, it is an object of the invention to provide a mechanism which reduces the amount of hot gas leaking into the annular space between the outer casing and the turbine shroud and further downstream, that is, the annular space between the casing and the nozzle segments.

Another object of the invention is to provide a turbine shroud which is axially slidable relative to the nozzle supporting its aft edge during differential thermal expansion of the turbine shroud and the nozzle.

A further object of the invention is to provide a turbine shroud which is supported by the downstream nozzle without the necessity of an axial clearance fit therebetween to compensate for thermal expansion.

Yet another object is to provide means for discouraging the flow of hot gases into the spaces between the shrouds and the casing. In particular, it is an object of the invention to impede the flow of hot gases through the interface between the turbine shroud and the nozzle due to differential curvature of the abutting shroud and nozzle surfaces during thermal expansion, that is, due to seam chording.

A further object is to provide a turbine shroud which is inexpensive to manufacture and easy to install inside the turbine.

These and other objects are realized in accordance with the invention by installing a turbine shroud, comprising a circumferential array f butted shroud segments, between the outer casing and a nozzle so that the aft edge of the turbine shroud surrounds the forward tip of the outer shroud of the nozzle. The aft edge of the turbine shroud is unconstrained by the nozzle outer shroud and therefore can slide axially relative thereto during differential thermal expansion of the turbine shroud and nozzle segments in the axial direction.

In accordance with the invention, each shroud segment is urged radially inward against the forward tip of the outer shroud of a corresponding nozzle segment by one of a plurality of springs. The springs also provide axial seating for the shroud segments. The springs are designed and arranged so that the point of maximum strain is moved away from the point of maximum temperature in each spring.

In accordance with the invention, spline seals are inserted between abutting, circumferentially facing ends of adjacent shroud segments to reduce leakage. Each shroud segment comprises a backing sheet which is isolated from the hot gas flow through the turbine by honeycomb material. The honeycomb material also discourages hot gas flow through any gap between the turbine shroud and outer shroud of the nozzle due to seam chording. A braided rope seal is provided at the forward edge of the turbine shroud to further reduce leakage.

BRIEF DESCRIPTION OF THE DRAWINGS

These and other advantages of the invention will be better understood when the detailed description of the preferred embodiment of the invention is read in conjunction with the drawings, wherein:

FIG. 3 is a top view of the turbine shroud segment depicted in FIG. 2; and

FIG. 4 is a side view of the turbine shroud segment depicted in FIG. 2.

DETAILED DESCRIPTION OF THE PREFERRED EMBODIMENT

Figure 1:
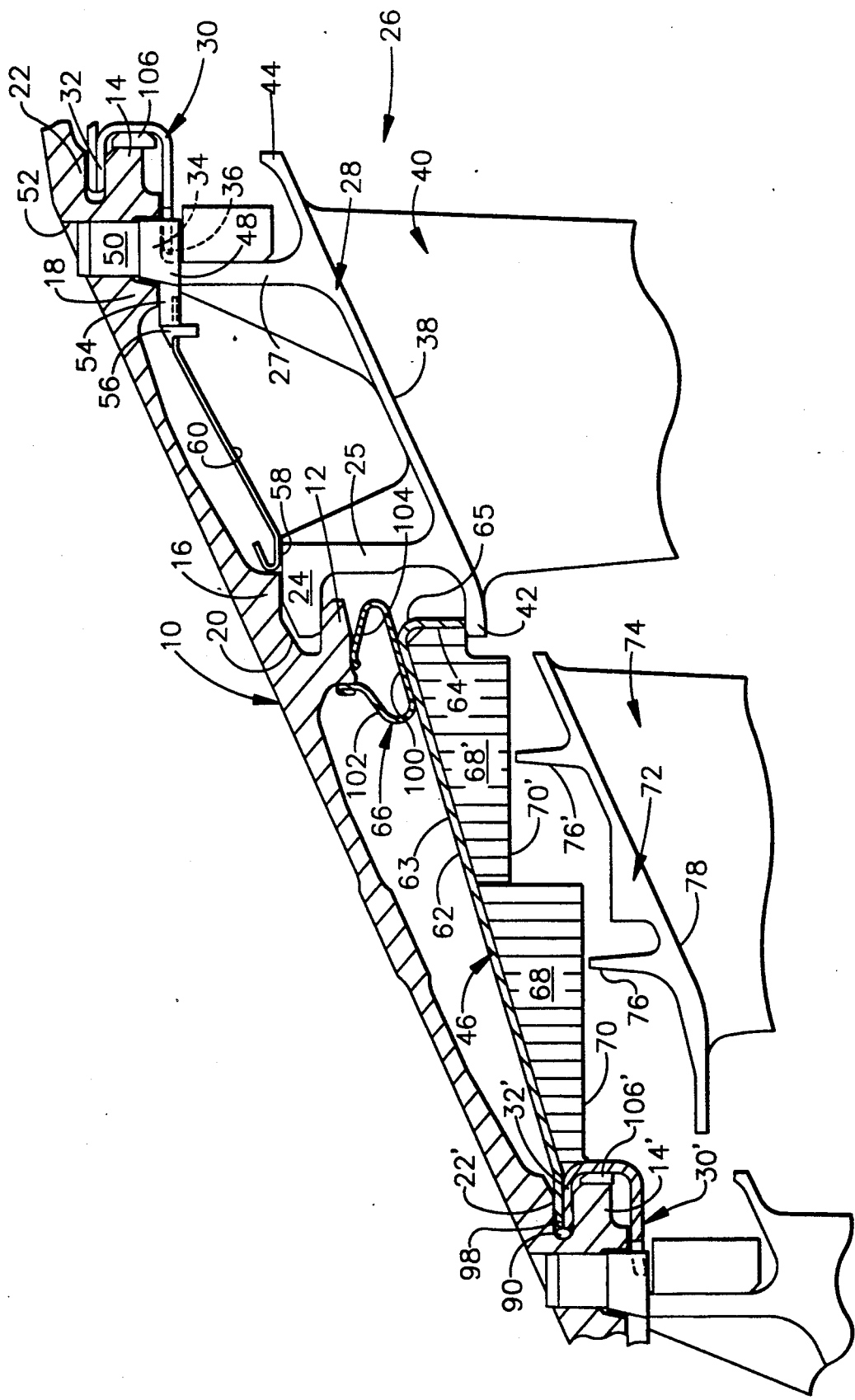
FIG. 1 is a cross-sectional view taken in a radial plane of a portion of the gas turbine engine incorporating a turbine shroud in accordance with the preferred embodiment of the invention.

In accordance with the preferred embodiment of the invention shown in FIG. 1, a low-pressure turbine of a gas turbine engine has an outer casing 10. Casing 10 has axially rearwardly directed annular flanges 12, 14 and 14' and bosses 16 and 18. Annular flange 12 and boss 16 partially define an annular groove 20 therebetween.

Annular groove 20 receives an annular flange 24 extending forward from a radially outwardly extending forward portion 25 of the outer platform of a nozzle segment generally indicated at 26. Annular groove 22 receives a leg 32 of each one of a plurality of annularly segmented C-clips 30.

Each C-clip 30 is connected to the corresponding downstream turbine shroud segment, for example, by brazing. The other leg 36 of each C-clip 30 has a radially outwardly facing surface which supports an annular flange 34 extending rearward from a radially outwardly extending rear portion 27 of the outer platform of each nozzle segment 26. Leg 36 has a recess which mates with an anti-rotation block 48. Anti-rotation block 48 is connected to anti-rotation pin 50, which in turn is securely mounted inside a bore 52 formed in outer casing 10. Twenty such anti-rotation pins are circumferentially distributed at equal intervals about the outer casing at the same axial position. This prevents rotation of the turbine shroud segment connected to C-clip 30.

In addition, an axial stop 106 is brazed to C-clip 30. Axial stop 106 has a radially extending surface which bears against an opposing radially extending surface of flange 14, thereby stopping forward axial displacement of the associated turbine shroud segment.

The radially innermost portion of the outer platforms of the arrayed nozzle segments 26 form an outer shroud 28 having a radially inwardly facing surface 38 which defines a portion of the outer boundary of an annular passageway for guiding the flow of hot gases therethrough.

Each nozzle segment has a plurality of nozzle guide vanes 40, with each vane comprising an airfoil section, circumferentially distributed in a radial plane of the annular passageway and supported by the inner (not shown) and outer platforms. A plurality of such nozzle segments are assembled into an annular array to form a stator stage. This stator stage redirects the hot gas flow from the upstream rotor so that it enters the next stage at the desired angle.

Flange 34 of each nozzle segment 26 has a recess (not shown) which mates with an extension 54 of the anti-rotation block 48. This mating of the recesses in the nozzle segments with the anti-rotation devices blocks rotation of the nozzle segments about the axial axis.

The outer shroud 28 has a forward tip 42 and a rearward tip 44. The forward tip 42 abuts an annular flange 64 extending radially inwardly from a backing sheet 62 of a turbine shroud segment generally indicated at 46. The backing sheet 62 is made of HS188 sheet metal and includes a substantially conical segment 63 and an annular curved segment 65 which connects conical segment 63 to annular flange 64. A generally cylindrical forward segment 98 of backing sheet 62 and leg 32' of an annularly segmented C-clip 30' are connected and arranged in the annular groove 22' formed between the skin of outer casing 10 and annular flange 14'. Each C-clip 30' has an axial stop 106' brazed thereto.

The C-clips 30 and 30' are protected by TBC, a sprayed-on thermal barrier coating composed of ceramic material. A braided rope seal 90 is inserted in the forward tip of annular groove 22' to prevent the leakage of hot gases around the forward tip of backing sheet 62 and into the space between shroud segment 46 and outer casing 10.

A spring 66 arranged between flange 12 of outer casing 10 and backing sheet 62 urges the flange 64 radially inwardly to bear against the radially outwardly facing annular surface of forward tip 42 of outer shroud 28. Spring 66 also resists axial displacement of the turbine shroud segment 46 in the aft direction.

The backing sheet 62 of each turbine shroud segment 46 has first and second members 68 and 68' made of honeycomb or similarly compliant material bonded or otherwise fastened to the radially inwardly facing surface thereof at adjacent axial positions. The honeycomb members have abradable working surfaces 70 and 70' respectively. The honeycomb material also discourages hot gas flow through any gap between flange 64 and forward tip 42 due to seam chording.

A plurality of such turbine shroud segments 46 are assembled into an annular array to form a turbine shroud which surrounds an array of abutting tip shrouds 72 on the rotor blades 74. The tip shrouds have radially inwardly facing surfaces 78 which define another portion of the outer boundary of the annular passageway for guiding the flow of hot gases therethrough. The rearward edge of the tip shroud 72 of rotor blade 74 is radially located so that hot gases flowing off of surface 78 will impinge on surface 38 of outer shroud 28 of nozzle segment 26.

The tip shroud 72 of each rotor blade 74 has a pair of radially outwardly extending sealing fins 76 and 76' formed thereon which also extend circumferentially. The sealing fins 76 and 76' of adjacent rotor blades have mutually abutting circumferentially facing side surfaces and respective circumferential edges which are positioned adjacent the working surfaces 70, 70' of the honeycomb material. The working surfaces 70, 70' are deformed by the sealing fins during rotation of the associated rotor blade into an essentially zero tolerance fit with the sealing fins, thereby reducing the flow of hot gases radially outside of the annular array of tip shrouds 72.

Flange 64 of turbine shroud segment 46 is urged radially inward toward tip 42 of outer shroud 28 by spring 66, thereby resisting separation of the shrouds due to vibration. However, spring 66 cannot prevent the formation of a gap due to a difference in the respective radii of curvature of the arched edge of flange 64 and the radially outer surface of tip 42 caused by differential expansion. The result is that hot gases will leak into the space between the outer platform of nozzle segment 26 and outer casing 10 via either a path around flange 24 of the outer platform of nozzle segment 26 or a path between the abutting faces of adjacent nozzle segments.

A heat shield 60, preferably in the form of a ring of HS188 sheet metal, is arranged in the space between the outer platform of nozzle segment 26 and the outer casing 10. One function of heat shield 60 is to isolate the outer casing 10 from heat radiation from the outer platform of nozzle segment 26. Another function of heat shield 60 is to isolate outer casing 10 from the hot gases leaking into the space between nozzle segment 26 and outer casing 10

The heat shield has a plurality of circumferentially distributed axial recesses extending from its aft edge. Each recess has an axial stop 56 mounted therein which slides against the end face of an extension 54 of the anti-rotation block 48. The structure of heat shield 60 and the manner in which it minimizes casing temperature are disclosed in greater detail in co-pending U.S. patent application Ser. No. 07/799,799 (commonly assigned to the assignee of the present application), which disclosure is incorporated by reference herein.

Figure 2:
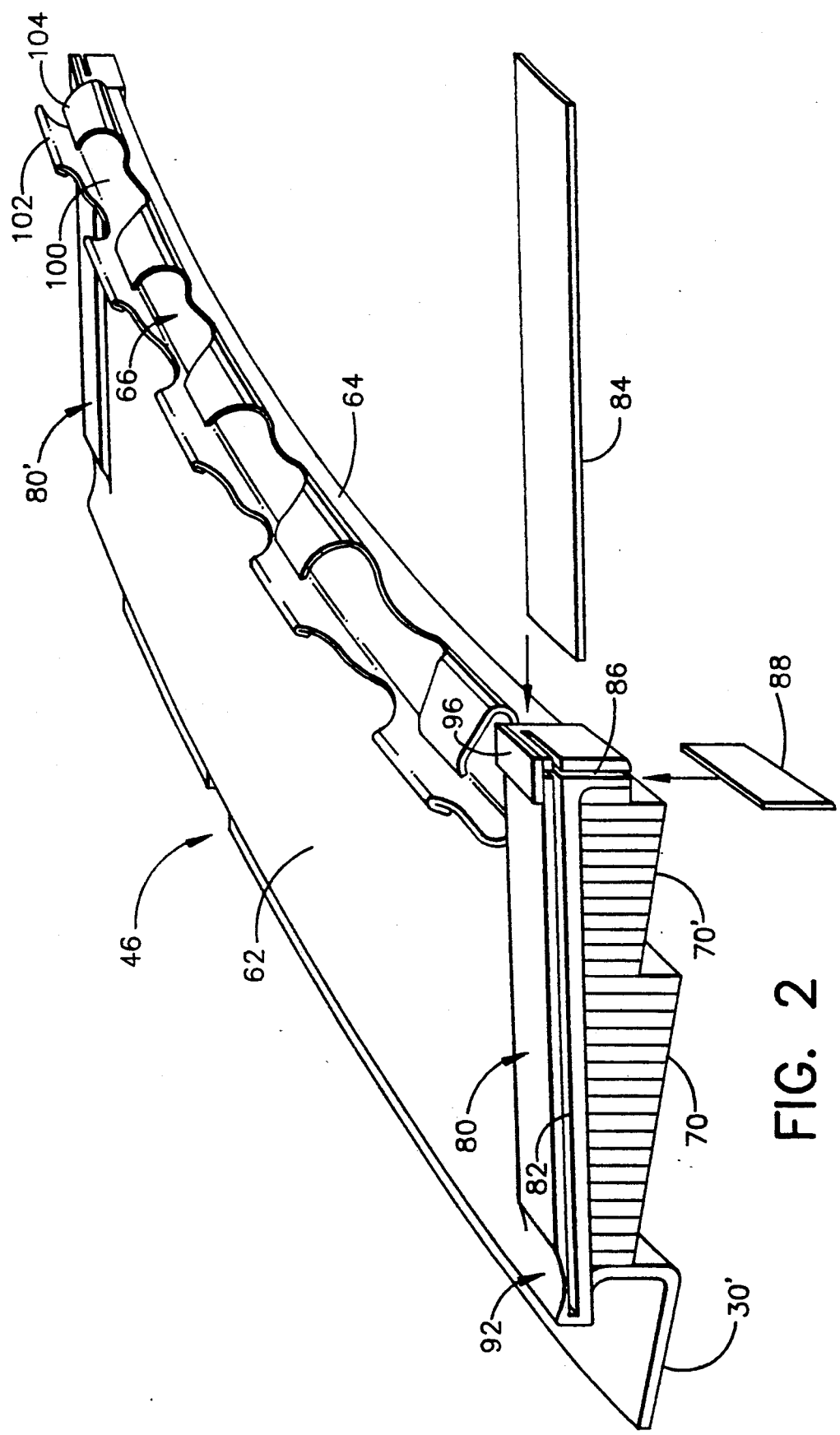
FIG. 2 is a perspective view of a segment of the turbine shroud in accordance with the preferred embodiment of the invention.

The structure of turbine shroud segment 46 is best seen in FIG. 2. Respective abutments 80 and 80' are connected to the respective ends of the shroud segment. Each abutment comprises a first straight portion disposed substantially radially and connected to flange 64 and a second straight portion disposed at an angle less than 90 degrees relative to the first portion and connected to backing sheet 62. Relief 92 is provided at the forward ends of each abutment to allow cocking of the shroud segment during assembly without loss of the tight fit between the shroud and casing.

Each abutment has a slot 82 in the second portion for receiving an axial spline seal 84 and a slot 86 in the first portion for receiving a radial spline seal 88. Slots 82 and 86 intersect. Slots 82 and 86 are designed to allow wire electro-discharge machining, which is cheaper and more precise than conventional electro-discharge machining.

The design shown in FIG. 2 allows an entire stage of turbine shrouds to be assembled into place and the spline seals to be subsequently inserted. The axial seals are inserted first; then the radial seals are inserted. As best seen in FIG. 4, the axial seal 84 is retained by the radial seal 88. The radial seal is in turn retained at the radially outer end of slot 86 by retainer 96 and at the radially inner end of slot 86 by the abutting radially outer surface of forward tip 42 of the outer shroud 28 of nozzle segment 26. Seals 84 and 88 are planar strips of metal which slide easily into slots 82 and 86 respectively.

The abutments of adjacent shroud segments have sufficient play therebetween to allow for thermal expansion of the segments in the circumferential direction. Seals 84 and 88 seal the gaps between opposing abutments against leakage of hot gas from the annular gas flow passageway.

Each C-clip 30' has a recess 94 (see FIG. 3) for receiving an anti-rotation block (not shown) secured to the casing. The coupling of recess 94 and the anti-rotation block prevents rotation of the shroud segments about the axial axis.

The structure of spring 66 is best seen in FIGS. 2 and 3. Spring 66 comprises a conical segment 100 having a first plurality of fingers 102 extending from and circumferentially distributed along its forward end and a second plurality of fingers 104 extending from and circumferentially distributed along its aft end. Spring 66 is made of a metal having a composition such that the fingers retain their resiliency at the high temperatures to which the spring is subjected. The scalloped construction of spring 66 ensures sufficient compliance for assembly and moves the point of maximum strain away from the point of maximum temperature, i.e., conical segment 100.

Spring 66 provides axial and radial seating during cruise. As shown in FIG. 1, conical segment 100 of spring 66 bears against the top surface of the conical segment 63 of backing sheet 62 in the vicinity of the aft end thereof. Fingers 104 bear against a radially inwardly facing surface on annular flange 12 of casing 10, thereby urging the tip of annular flange 64 of turbine shroud 46 radially inwardly against the radially outer surface of forward tip 42 of outer shroud 28 of nozzle segment 26. Fingers 102 bear against an axially forwardly facing surface on annular flange 12, thereby opposing axial displacement of turbine shroud 46 in the aft direction.

The preferred embodiment has been described in detail hereinabove for the purpose of illustration only. It will be apparent to a practitioner of ordinary skill in the art of gas turbine engines that various modifications could be made to the above-described structure without departing from the spirit and scope of the invention as defined in the claims set forth hereinafter.

I claim:

1. A turbine shroud for incorporation in a turbine of a gas turbine engine, comprising a plurality of butted shroud segments circumferentially arrayed to form a ring, each pair of adjacent shroud segments having opposing abutments with axial and radial seals arranged therebetween, each of said shroud segments comprising a radially extending annular flange and a backing sheet, wherein said backing sheet comprises a substantially conical segment and an annular curved segment connecting the radially outer periphery of said radially extending annular flange with the portion of said substantially conical segment of said backing sheet having the maximum radius of curvature thereof, said radially extending annular flange, said substantially conical segment and said annular curved segment all forming part of a continuous sheet of metal, and each of said abutments having first slot means for receiving said axial seal and second slot means for receiving said radial seal.

2. The turbine shroud as defined in claim 1, further comprising honeycomb material affixed to a radially inwardly facing surface of said substantially conical segment of said backing sheet of each of said shroud segments.

3. The turbine shroud as defined in claim 1, wherein each of said shroud segment backing sheets further comprises a substantially cylindrical forward segment connected to the portion of said substantially conical segment of said backing sheet having the minimum radius of curvature thereof and wherein each of said shroud segments further comprises a C-shaped clip connected to said forward segment.

4. The turbine shroud as defined in claim 1, wherein said first and second slot means of opposing abutments define straight first and second slots respectively which mutually intersect, and said axial and radial seals comprise planar strips of metal slidable into said first and second slots respectively.

5. The turbine shroud as defined in claim 1, wherein said axial seal is retained in said first slot means of each of said abutments by said radial seals when said radial seal is slidably inserted in said second slot means of opposing abutments.

6. A turbine shroud segment for incorporation in a turbine of a gas turbine engine, comprising a radially extending annular flange and a backing sheet, wherein said backing sheet comprises a substantially conical segment and an annular curved segment connecting the radially outer periphery of said radially extending annular flange with the portion of said substantially conical segment of said backing sheet having the maximum radius of curvature thereof, said radially extending annular flange, said substantially conical segment and said annular curved segment all forming part of a continuous sheet of metal, and further comprising first and second abutments respectively connected to opposing circumferential ends of said backing sheet and said radially extending annular flange, each of said first and second abutments having a respective circumferentially facing abutment surface, wherein each of said circumferentially facing abutment surfaces has first and second slots formed therein.

7. The turbine shroud segment as defined in claim 6, further comprising honeycomb material affixed to a radially inwardly facing surface of said substantially conical segment of said backing sheet.

8. The turbine shroud segment as defined in claim 6, wherein said backing sheet further comprises a substantially cylindrical forward segment connected to the portion of said substantially conical segment of said backing sheet having the minimum radius of curvature thereof and wherein said shroud segment further comprises a C-shaped clip connected to said forward segment.

9. The turbine shroud segment as defined in claim 6, wherein said first and second slots are straight and mutually intersect.

10. A turbine for a gas turbine engine having an inlet, an outlet and an annular passageway for gas flow from said inlet to said outlet, comprising;
   a) an outer casing surrounding said annular passageway, said outer casing having an annular groove;
   b) a nozzle stage arranged inside said outer casing and supported thereby, said nozzle stage comprising an outer platform having a shroud portion which forms a part of said annular passageway, said shroud portion having a forwardly projecting annular tip;
   c) a plurality of butted turbine shroud segments circumferentially arrayed to form a ring, each of said turbine shroud segments having a first, axially forward end seated in said annular groove of said outer casing and a second, axially aft end seated on a radially outer surface of said annular tip of said shroud portion; and
   d) spring means for urging said second, axially aft end of said shroud segment radially inwardly to bear against said radially outer surface of said annular tip of said shroud portion.

11. The turbine as defined in claim 10, wherein said spring means is seated on said shroud segment and comprises a first plurality of circumferentially distributed resilient fingers which bear against a substantially radially inwardly facing surface of said outer casing.

12. The turbine as defined in claim 11, wherein said spring means further comprises a second plurality of circumferentially distributed resilient fingers which bear against a substantially axially forwardly facing surface of said outer casing.

13. A turbine for a gas turbine engine having an inlet, an outlet and an annular passageway for gas flow from said inlet to said outlet, comprising;
   a) an outer casing surrounding said annular passageway, said outer casing having an annular groove;
   b) a nozzle stage arranged inside said outer casing and supported thereby, said nozzle stage comprising an outer platform having a shroud portion which forms a part of said annular passageway, said shroud portion having a forwardly projecting annular tip;
   c) a plurality of butted turbine shroud segments circumferentially arrayed to form a ring, each of said turbine shroud segments having a first end seated in said annular groove of said outer casing and a second end seated on a radially outer surface of said annular tip of said shroud portion; and
   d) spring means for urging said second end of said shroud segment radially inwardly to bear against said radially outer surface of said annular tip of said shroud portion;
   e) wherein said spring means is seated on said shroud segment and comprises
      i) a first plurality of circumferentially distributed resilient fingers which bear against a substantially radially inwardly facing surface of said outer casing, and
      ii) a second plurality of circumferentially distributed resilient fingers which bear against a substantially axially forwardly facing surface of said outer casing; and
   f) wherein said substantially radially inwardly facing surface and said substantially axially forwardly facing surface are surfaces of an annular flange projecting from said outer casing, said outer platform of said nozzle stage being hooked onto said annular flange of said outer casing.

14. A turbine for a gas turbine engine having an inlet, an outlet and an annular passageway for gas flow from said inlet to said outlet, comprising;
   a) an outer casing surrounding said annular passageway, said outer casing having an annular groove;
   b) a nozzle stage arranged inside said outer casing and supported thereby, said nozzle stage comprising an outer platform having a shroud portion which forms a part of said annular passageway, said shroud portion having a forwardly projecting annular tip;
   c) a plurality of butted turbine shroud segments circumferentially arrayed to form a ring, each of said turbine shroud segments having a first end seated in said annular groove of said outer casing and a second end seated on a radially outer surface of said annular tip of said shroud portion;

d) spring means for urging said second end of said shroud segment radially inwardly to bear against said radially outer surface of said annular tip of said shroud portion;

e) wherein each pair of adjacent shroud segments has opposing abutments with axial and radial seals arranged therebetween;

f) wherein each of said shroud segments comprises a radially extending annular flange and a backing sheet, wherein said backing sheet comprises a substantially conical segment and an annular curved segment connecting the radially outer periphery of said radially extending annular flange with the portion of said substantially conical segment of said backing sheet having the maximum radius of curvature thereof, said radially extending annular flange, said substantially conical segment and said annular curved segment all forming a part of a continuous sheet of metal; and g) wherein each of said abutments having first slot means for receiving said axial seal and a second slot means for receiving said radial seal.

15. The turbine as defined in claim 14, further comprising honeycomb material affixed to a radially facing surface of said substantially conical segment of said backing sheet of each of said shroud segments.

16. The turbine as defined in claim 14, wherein each of said shroud segment backing sheets further comprises a substantially cylindrical forward segment connected to the portion of said substantially conical segment of said backing sheet having the minimum radius of curvature thereof and wherein each of said shroud segments further comprises a C-shaped clip connected to said forward segment, said forward segment forming said first end.

17. The turbine as defined in claim 14, wherein said first and second slot means of opposing abutments define straight first and second slots respectively which mutually intersect, and said axial and radial seals comprise planar strips of metal slidable into said first and second slots respectively.

18. The turbine as defined in claim 14, wherein said axial seal is retained in said first slot means of each of said abutments by said radial seal when said radial seal is slidably inserted in said second slot means of opposing abutments.

19. The turbine as defined in claim 16, further comprising a plurality of anti-rotation means circumferentially distributed at regular intervals along and secured to said outer casing, wherein each of said C-shaped clips has an axial recess mating with a portion of a corresponding anti-rotation means and forms a seat for an annular flange on said outer platform of a corresponding segment of said nozzle stage.

* * * * *